United States Patent [19]

Pirsh

[11] 4,309,386
[45] Jan. 5, 1982

[54] FILTER HOUSE HAVING CATALYTIC FILTER BAGS FOR SIMULTANEOUSLY REMOVING $NO_x$ AND PARTICULATE MATTER FROM A GAS STREAM

[75] Inventor: Edward A. Pirsh, Akron, Ohio

[73] Assignee: The Babcock & Wilcox Company, New Orleans, La.

[21] Appl. No.: 126,639

[22] Filed: Mar. 3, 1980

Related U.S. Application Data

[62] Division of Ser. No. 34,518, Apr. 30, 1979, Pat. No. 4,220,633.

[51] Int. Cl.³ .................. B01D 29/10; B01J 15/00; F01N 3/02; F01N 3/28
[52] U.S. Cl. .................................. 422/177; 55/381; 422/197
[58] Field of Search ........... 423/239 R, 351, DIG. 13, 423/239 A; 252/477, 462; 55/524, 381, 382; 422/177, 197, 172, 181

[56] References Cited

U.S. PATENT DOCUMENTS

| | | | |
|---|---|---|---|
| 2,932,362 | 4/1960 | Roper | 55/524 |
| 3,925,248 | 12/1975 | Moroni et al. | 55/524 |
| 3,929,671 | 12/1975 | Nakamura et al. | 252/477 R |
| 3,993,600 | 11/1976 | Hunter | 55/524 |
| 4,046,525 | 9/1977 | Matsuo et al. | |
| 4,131,432 | 12/1978 | Sato et al. | 422/177 |
| 4,196,027 | 4/1980 | Walker et al. | 55/524 |
| 4,227,904 | 10/1980 | Kasmark et al. | 55/524 |

FOREIGN PATENT DOCUMENTS 2220023 11/1973 Fed. Rep. of Germany ........ 55/524

Primary Examiner—Bradley Garris
Attorney, Agent, or Firm—Robert J. Edwards; John L. LaPierre

[57] ABSTRACT

A filter house (12) employing a selective catalytic reduction process for removing $NO_x$ emissions from a flue gas stream while simultaneously filtering out and collecting entrained particulate matter from the stream. Accordingly, the filter house (12) includes flue gas inlet and outlet passages (18, 30) and a plurality of porous filter bags. The bags are treated with a suitable catalyst to facilitate the selective catalytic reduction process.

3 Claims, 1 Drawing Figure

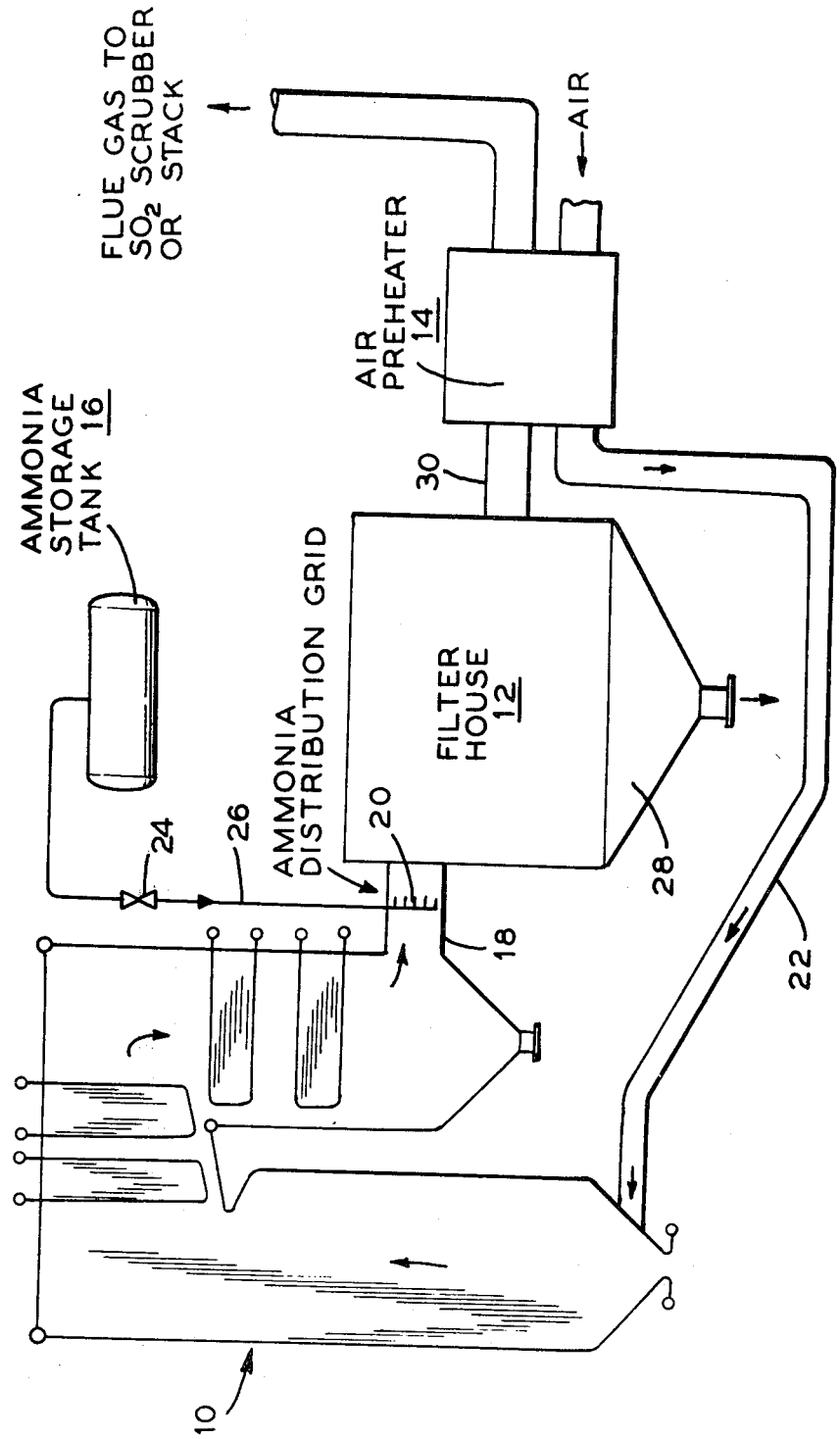

FILTER HOUSE HAVING CATALYTIC FILTER BAGS FOR SIMULTANEOUSLY REMOVING $NO_x$ AND PARTICULATE MATTER FROM A GAS STREAM

This is a division of application Ser. No. 034,518 filed Apr. 30, 1979, now U.S. Pat. No. 4,220,633.

TECHNICAL FIELD

This invention relates to filter bag houses in general and more specifically to a filter house designed to simultaneously remove both $NO_x$ and entrained particulate matter from a flue gas stream.

BACKGROUND ART

There is no question that in recent years environmental restrictions on permissible power plant pollutant output levels have become more restrictive. As a consequence, both the private and public sectors have been devising means and methods to reduce debilitating pollution levels.

One particularly invidious form of pollution is caused by $NO_x$ emmissions. $NO_x$ (the generic name for the oxides of nitrogen) is formed by both fuel-bound nitrogen and the free nitrogen contained in the combustion air introduced into a combustion chamber according to the following formulae:

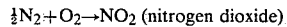
$\tfrac{1}{2}N_2 + O_2 \rightarrow NO_2$ (nitrogen dioxide)

$N_2 + O_2 \rightarrow 2NO$ (nitric oxide)

It has been long known that the oxides of nitrogen are one of the main constituents of photochemical smog. Furthermore, nitrogen dioxide ($NO_2$) is a dangerous substance in of itself. To put the $NO_x$ emissions problem in perspective, it has been estimated that United States power plants generate approximately 4.5 million tons of $NO_x$ a year. In comparison, mobile power sources (primarily internal combustion engines) produce an additional 8 million tons of $NO_x$ a year. Obviously, it is necessary to reduce the generation of $NO_x$.

The production of $NO_x$ formed by various combustion schemes may be decreased by a considerable degree by modifying the underlying combustion process itself. For example, delayed combustion, staged combustion, and the vitiation of combustion air have been successfully employed in the past. Unfortunately, the $NO_x$ reduction that can be achieved by such means may not be sufficient to meet the allowable emission criteria in many localities. As a consequence, post-combustion removal of the undesirable $NO_x$ is required.

Further to the above, there are a variety of wet and dry processes that have been developed over the years for post-combustion $NO_x$ removal. The instant invention relates to a dry process known as "selective catalytic reduction". This process involves, firstly, the addition of ammonia to an exiting flue gas stream and secondly, the subsequent passage of the ammonia/gas mixture in registry with a suitable catalyst to selectively reduce the $NO_x$ to nitrogen and water.

The chemical mechanisms underlying the selective catalytic reduction process are as follows:

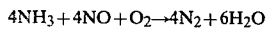
$4NH_3 + 4NO + O_2 \rightarrow 4N_2 + 6H_2O$

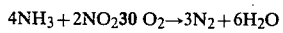
$4NH_3 + 2NO_2 3O_2 \rightarrow 3N_2 + 6H_2O$

As the title of the process suggests, a suitable catalyst is employed to facilitate the desired chemical reduction process. As always, of course, the catalyst itself does not become involved in the reaction but rather it merely accelerates the reduction of the $NO_x$ into nitrogen and water.

Various catalysts of both noble and non-noble metal compositions for use in the selective reduction of $NO_x$ have been suggested. For example, platinum and copper oxide (to name just two) have been mentioned.

Furthermore, there are several types of reactors for carrying out the process. One type of catalytic reactor utilizes catalyst beds which may be fixed, moving or fluidized. Another design employs well-defined flow passages whose boundaries are porous, non-catalytic surfaces which envelop the catalyst and through which the reactants and products diffuse. Alternatively, the surfaces themselves may be comprised of the catalyst.

A review of the relevant art indicates that prior art selective catalytic reduction processes are independent of and separate from the particulate collecting apparatus positioned downstream gas flow-wise from a combustion chamber. However, as a result of the combustion process, many power plants also emit large quantities of particulate matter (ash, soot, dust, unburned carbon, etc.) that must be trapped and collected before the flue gas is permitted to exit to the atmosphere. Various individual components have been successfully utilized in the past, i.e. cyclone collectors, wet scrubbers, electrostatic precipitators and bag houses.

The employment of several air pollution abatement devices in seriatim is expensive from both space utilization considerations and from labor considerations.

Clearly, a single device capable of treating a myriad of pollution problems is desirable.

SUMMARY OF THE INVENTION

The disclosed invention successfully accomplishes the aforementioned goal.

Accordingly, there is provided an improved filter house for removing or cleansing $NO_x$ emissions from a flue gas stream while simultaneously filtering out entrained particulate matter from the same stream. As a consequence of this design, the filter house includes flue gas inlet and outlet passages and a plurality of filter bags disposed within the housing. The bags are treated with a catalyst to facilitate the selective catalytic reduction process while simultaneously filtering out the particulate matter entrained within the gas stream. The housing is situated downstream gas flow-wise from an ammonia injector. The ammonia is introduced into the flue gas inlet via an ammonia distribution grid. The filter bags display an integral catalyst to the gas stream to effect $NO_x$ removal.

BRIEF DESCRIPTION OF THE DRAWING

The drawing is a schematic embodying the invention.

BEST MODE FOR CARRYING OUT THE INVENTION

Referring to the figure, there is shown a schematic representation of a vapor generator 10 and a filter house 12. The filter house 12 is disposed between the generator 10 and an air preheater 14. An ammonia storage tank 16 is positioned to introduce ammonia into flue gas inlet conduit 18 via ammonia distribution grid 20. It should be understood that other ammonia injection systems are suitable as well. Hopper 28 stores collected particulate matter. Flue gas outlet conduit 30 connects the filter house 12 with the air preheater 14.

The filter house 12 utilizes catalytic filter bags (not shown) to reduce the $NO_x$ emissions produced within the generator 10 into steam ($H_2O$) and nitrogen ($N_2$) while simultaneously filtering out particulate matter from the exiting flue gas stream. The treated gas is subsequently passed through the air preheater 14 before it is sent to a stack (not shown) for release into the atmosphere. In some instances, an $SO_2$ scrubber (not shown) may be interposed between the stack and the air preheater 14.

Valve 24, positioned within ammonia feed line 26, regulates the quantity of ammonia injected into the flue gas stream.

Combustion air, for various thermodynamic reasons, is usually preheated (by the preheater 14) before it is ultimately introduced into the generator 10 via air conduit 22.

Briefly, a filter house (or bag house) operates as a large vacuum cleaner. Particulate-laden gas is passed through a plurality of large fabric filter bags disposed within the filter house. Due to the mechanical filtering action of the bags, the gas is stripped of its entrained particulate matter. Whereas the dustfree gas is allowed to exit the filter house, the particulate matter is trapped on the surfaces of the bags. Suitable means are provided to periodically cleanse both the filter house and the bags of the accumulated material.

As was discussed previously, the removal of $NO_x$ is accomplished by passing the ammonia entrained flue gas through the catalytic filter bags. Noble (gold, silver, paladium, etc.) or non-noble metallic catalysts may be utilized. For example, platinum (a noble metal), iron base ammonia decomposition catalysts, iron-chromium oxide mixtures, zirconium promoted lanthanum cuprate, and the various oxides of copper, iron, vanadium, cobalt, molybdenum, manganese, and tungsten may be employed with the instant invention. The foregoing recitation is not meant to be exhaustive; rather, other suitable catalysts may be employed as well.

The catalysts may be incorporated into or on the filter fabric by several means. Metals that are sufficiently ductile may be drawn into filaments which may be interspersed with the filter fabric fibers in the production of matted fabrics or be twisted into the thread from which the fabric is woven. Where a metal oxide is to be the desired catalyst (as in the case of non-noble metals), exposure of the combined fabric/filament material to the air or even to its operating environment will normally oxidize the surface of the filaments.

Of course, the fabric/filament material may be treated under conditions more severly oxidizing than the contemplated operating environment if a greater extent of oxidation of the filament is desired.

Another method of treating the filter bags with the catalyst is to coat the surface of the fabric fibers, either prior to or after the actual weaving process. The catalyst may be sprayed on the fibers with a suspension of finely divided catalyst or with a solution of the appropriate metal catalyst salts which then may be subsequently converted to the desired oxide form. When the catalyst is to be applied to the woven fabric in this fashion, the spraying process may be accomplished independently from or combined with the finishing treatment used to lubricate the fibers.

Another alternative method is to pre-coat the fabric with a finely divided catalyst. This operation is conducted prior to placing the fabric filters into service and may be conducted prior to the installation of the filter bags in the filter house or after their installation but prior to service. Pre-coating is accomplished by suspending finely divided catalyst in a flowing gas stream which is then passed through the bags to coat the filtering side of the bag uniformly with catalyst. The finely divided catalyst lodges in the interstices of the weave pattern where it remains during operation. Some catalyst also is held to the cloth by adhesive forces that exist between the cloth and the catalyst.

The fabric employed must be one which is suitable to withstand the temperatures of the exiting flue gas. The selective catalytic reduction reaction normally occurs within a temperature range between 250° C. to 400° C. (432° F. to 752° F.). As a consequence, the fabric selected for the filter bags may be glass, metal, refractory, ceramic or similar fibers capable of withstanding the contemplated service conditions.

While in accordance with the provisions of the statutes, there is illustrated and described herein specific embodiments of the invention, those skilled in the art will understand that changes may be made in the form of the invention covered by the claims and that certain features of the invention may sometimes be used to advantage without a corresponding use of the other features.

The embodiments of the invention in which an exclusive property or privilege is claimed are defined as follows:

1. An improved filter house for simultaneously cleansing a gas stream of NOx and entrained particulate matter, the filter house including a housing, a gas-flow inlet attached to the housing, a gas-flow outlet attached to the housing, a hopper in registry with the housing and a plurality of fibrous fabric filter bags disposed within the housing and in gas flow communication with the gas stream, the improvement comprising the filter bags displaying an integral catalyst, selected from the group consisting of a noble metal, zirconium promoted lanthanum cuprate, an iron base ammonia decomposition catalyst and the oxides of vanadium, cobalt, molybdenum, manganese, tungsten and iron-chromium, to the gas stream to effect NOx removal from the stream.

2. The filter house according to claim 1 wherein the catalyst is weaved into the fabric of the filter bags so that the catalyst is an integral component of the fabric.

3. The filter house according to claim 1 wherein means for introducing ammonia into the gas stream are disposed upstream gas flow-wise from the filter house.

* * * * *